Nov. 2, 1954

A. M. MARKS 2,693,529

FUNDAMENTAL TUNING DEVICE

Filed Nov. 30, 1945

3 Sheets-Sheet 1

Inventor
ALVIN M. MARKS

By M. C. Hayes

Attorney

Nov. 2, 1954 A. M. MARKS 2,693,529

FUNDAMENTAL TUNING DEVICE

Filed Nov. 30, 1945 3 Sheets-Sheet 2

Inventor
ALVIN M. MARKS

By

Attorney

Nov. 2, 1954 A. M. MARKS 2,693,529

FUNDAMENTAL TUNING DEVICE

Filed Nov. 30, 1945 3 Sheets-Sheet 3

Inventor

ALVIN M. MARKS

By M. O. Hayes

Attorney

United States Patent Office 2,693,529

Patented Nov. 2, 1954

2,693,529

FUNDAMENTAL TUNING DEVICE

Alvin M. Marks, United States Navy

Application November 30, 1945, Serial No. 632,095

12 Claims. (Cl. 250—20)

(Granted under Title 35, U. S. Code (1952), sec. 266)

This invention relates to a frequency distinguishing means for radio receivers, and more particularly, to automatic search and tuning means, and also to a means for automatically blocking spurious signals, and passing the received fundamental frequency.

In the operation of certain ultra-high frequency superheterodyne radio receivers ambiguous frequency readings often occur because of the presence of spurious responses. Spurious responses may be produced by non-linearity in the mixer, when harmonics of the fundamental frequency of the local oscillator combine in the mixer with an incoming signal having a fundamental frequency other than that to which the receiver is tuned, and a signal at the intermediate frequency is thereby produced. Under these circumstances, it is often difficult, if not impossible, to determine the true carrier frequency being received.

In the prior art attempts were made to use one or more stages of preselection in order to minimize trouble from spurious responses produced in superheterodyne receivers. However, preselection for ultra high frequency receivers, which are required to operate over an extended range, has not proven feasible to date. The inductor and capacitor circuit combinations commonly employed for wave trap application at lower frequencies are unsatisfactory in this instance because of the limited tuning range which may be obtained and the difficulty due to spurious resonances in the lumped circuit components.

Reference is made to copending applications of Lawrence W. Boothby, Serial No. 613,410, filed August 29, 1945, Patent No. 2,546,147, granted March 27, 1951, for Frequency Distinguishing Device; Serial No. 622,659, filed October 16, 1945, Patent No. 2,598,671, granted June 3, 1952, for Frequency Distinguishing Device, all of which relates to frequency distinguishing devices which are designed to be manually operated. In using a frequency distinguishing device of this nature, commonly an adjustable shorted half-wave stub which may be switched across the input coaxial line leading from the antenna to a superheterodyne receiver, the procedure is to search for the signal by tuning the receiver dial and to then move the contactor on the stub until the signal is strongly attenuated. Next, a frequency reading is made from the calibrated scale of the shorting stub, and the receiver dial is readjusted so as to coincide with the frequency reading on the shorting stub. At this point a signal should be received, and the signal strongly attenuated by the shorting stub when it is connected across the antennae feed. The present invention enables these and other operations to be performed automatically. In one embodiment of the present invention an indicator light may be flashed when a signal is being received to show that the dial reading is indicating the actual frequency of the received signal. In another embodiment of the present invention spurious signals are suppressed entirely by blocking the signal to the amplifier except when the frequency reading of the receiver dial corresponds to the actual frequency of the received signal. In still another embodiment of the present invention the receiver may be caused to track automatically and to stop at the precise frequency indication on the dial corresponding to the actual frequency of the received signal; but to continue tracking past all signals which create spurious responses.

Accordingly, it is one object of the present invention to provide automatic means for distinguishing between a plurality of signal responses, and to thereby enable the selection of a correct frequency reading corresponding to the fundamental of the carrier frequency actually being received by the radio receiver.

Another object of this invention is to provide an automatic frequency distinguishing device having a low insertion loss during the time signals are being received by the receiver.

Still another object of this invention is to provide an automatic frequency distinguishing device which is simple and compact and which will tune over a frequency range of the order of 26 to one.

A further object of this invention is to provide an automatic frequency distinguishing device which will enable a measurement of frequencies which are relatively high.

Still another object of this invention is to provide a means for blocking spurious responses picked up on a radio receiver, but to pass fundamental frequencies received corresponding to the calibrated frequency reading on the dial.

A further object of this invention is to impress an amplitude modulation upon a fundamental signal frequency, and to utilize this impressed amplitude modulation as a means of distinguishing that particular frequency from other frequencies.

Another object of this invention is to amplitude modulate a fundamental signal frequency at a super-sonic rate, and to employ the resultant signal to actuate responsive circuits for search, indication, or unblocking action, without effecting the audible content of the output signal.

Another object of this invention is to amplitude modulate a fundamental signal being received, at a rate synchronized with an input pulse, such that said amplitude modulation will occur between frames of a video signal.

A further object of this invention is to provide a novel electronic inter-connecting means between coaxial lines, and more particularly at a T-connection to a coaxial feeder line.

A still further object of this invention is to provide an electronic contacting means at a T-connection between a stub and a coaxial feeder line, and to provide for controlling the operation of said electronic contactor by externally applied voltages.

Other and further objects of this invention will be obvious upon understanding of the illustrative embodiments to be described, or will be indicated in the appended claims, and various advantages not referred to herein will be apparent to one skilled in the art upon employment of the invention in practice.

A preferred embodiment of the invention has been chosen for purposes of illustration and description, and is shown in the accompanying drawings forming a part of the specification in which.

Figure 1:
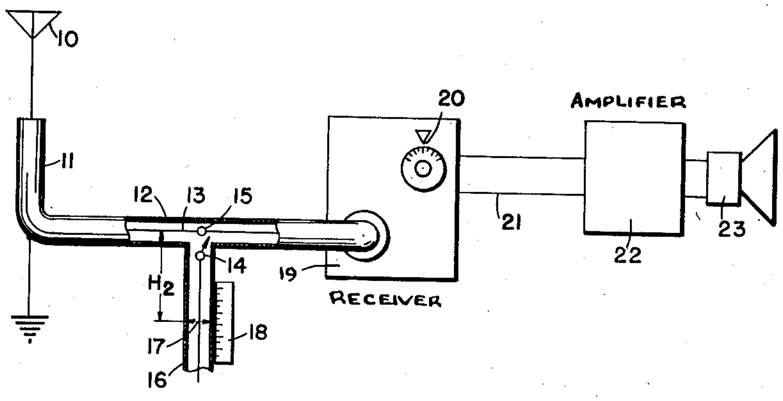
Fig. 1 shows a frequency distinguishing means according to one of the aforementioned prior copending applications.

Referring to Fig. 1 there is schematically shown a conventional frequency distinguishing device according to the prior art. Antenna 10 feeds through coaxial cable 11 to a T junction generally indicated as 12. At the T-junction 12 a stub 16 is mounted. The stub 16 has an internal shorting contactor 17 which is capable of manual motion along the stub and its position is indicated upon the scale 18. The central conductor of the stub may be connected to, or disconnected from, the central conductor of the coaxial feeder line 12 at points 14 and 15 respectively by means of a switch or contactor arranged therebetween. The coaxial feeder line may for example feed into a superheterodyne receiver 19 having a dial and indicator 20 and the superheterodyne receiver may be connected to an indicating device 23 thru a suitable amplifier 22. The indicating device may be, for example, a cathode ray screen or a loud speaker depending on the nature of the signal being received. In operation the dial 20 is adjusted until some signal is received and then the shorting contactor on the stub 17 is moved until the signal being received is attentuated when the switch 15 is contacting the feeder line conductor at 14. Often when spurious signals are being received along with the incoming signal, the frequency indicated upon the calibrated scale 18 will be different from frequency indicated on the calibrated dial 20. The calibrated dial 20 is then manually adjusted until the frequency thereon corresponds with the indicator frequency on 18. When this is done attenuation of the signal will again be observed when switch 15 is closed and the receiver is tuned to signals having the same frequency as the resonant frequency of the stub.

Figure 2:
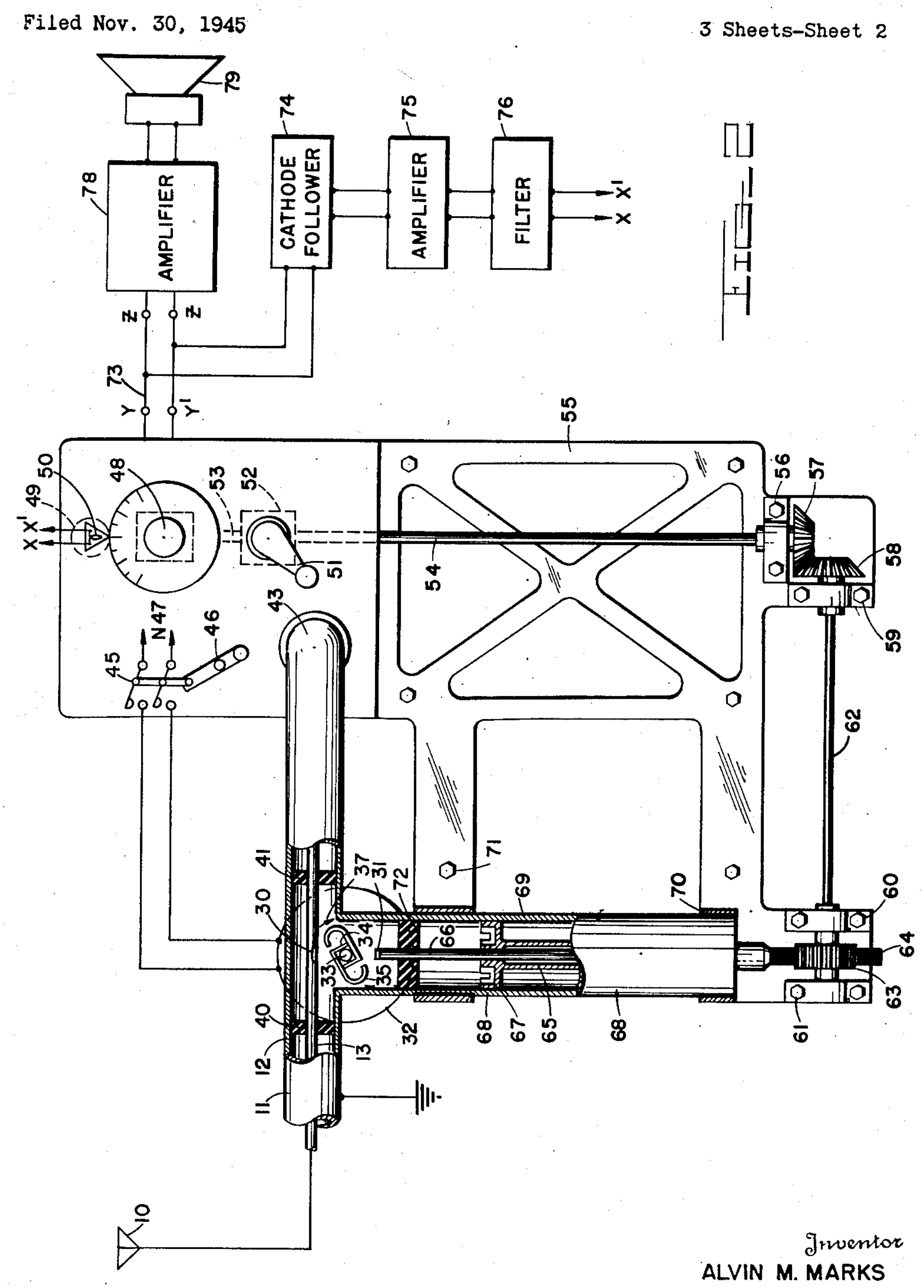
Fig. 2 is a schematic diagram showing an automatic frequency indicating device according to the present invention.

Referring to Fig. 2, there is shown a fundamental signal automatic indicator, according to this invention. In operation of the device shown in Fig. 2 it is merely necessary for the operator to revolve the crank 51 and watch the indicator over the receiver dial 48. Received spurious signals have no effect upon the indicator light 50; but, as the crank 51 is turned, a position on the dial 48 will be reached corresponding to the actual signal frequency being received, and thereupon indicator 50 will light to indicate this coincidence. This result is achieved as explained hereinafter.

In Fig. 2 the antenna 10 feeds the coaxial line 11. The central conductor 13, of the coaxial line 11, is supported by insulators 40 and 41 and has a contactor located on the axis of the stub 68, at 30. The stub 68, forms a T connection with the feeder cable 11, and has a central conductor 66 which is supported by the insulator 72. The shorting contactor 67 makes contact between the internal conductor 66 and the outer conductor 69, and is actuated by means of extension member 65 which may be a hollow cylinder coaxial with the conductor 66. On the end of the cylinder extension member 65 is formed a rack 64, which engages with pinion 63. Pinion 63 is mounted upon shaft 62, the shaft 62 being supported by the bearings 59, 60 and 61. On the other end of the shaft 62 is mounted a bevel gear 58, which engages the second bevel gear 57 upon the end of the shaft 54. The shaft 54 is actuated by means of the crank 51 through gear box 52. The crank 51 simultaneously actuates the dial 48 of the superheterodyne receiver, the shaft 53 leading from the gear box 52 to a suitable gear box upon the shaft of the dial 48. The indicator 49, may comprise a triangular translucent plastic window behind which is mounted electric bulb 50 which is connected through the terminals XX′ to the filter 76, the operation of which is described hereinafter. Returning to the T junction, the end of the conductor 66 of the stub, is provided with a contactor 31. The revolving contactor element, generally indicated as 33 makes sweeping contact between 30 and 31, and is actuated by a synchronous motor 32 which may be disconnected from the power line 47 by the contactors 45, from the panel switch 46; after a signal has been received and identified. During the revolution of 33, spring contactors 34 and 35 thereon will periodically make contact between 30 and 31, and also periodically break contact therewith. Contacts 30 and 31 may be designed so as to intercept any desired angular arc so as to vary the proportion of make contact to break contact time. It will be apparent that when stub 68 is tuned as a series resonant circuit to the frequency of a signal being conducted in line 11, and contactor 33 is revolving, the continuous wave signal in line 11 will be alternately attenuated and unattenuated as the connection between 30 and 31 is made and broken. This will produce a modulation of the amplitude of the continuous wave signal, at the frequency of rotation of the contactor. The envelope of this modulation will be substantially a square wave.

A suitable frame 55, which may be attached by bolts, 71, rigidly supports the receiver, coaxial feeder 11, stub 68, and associated mechanical linkages.

Figure 3:
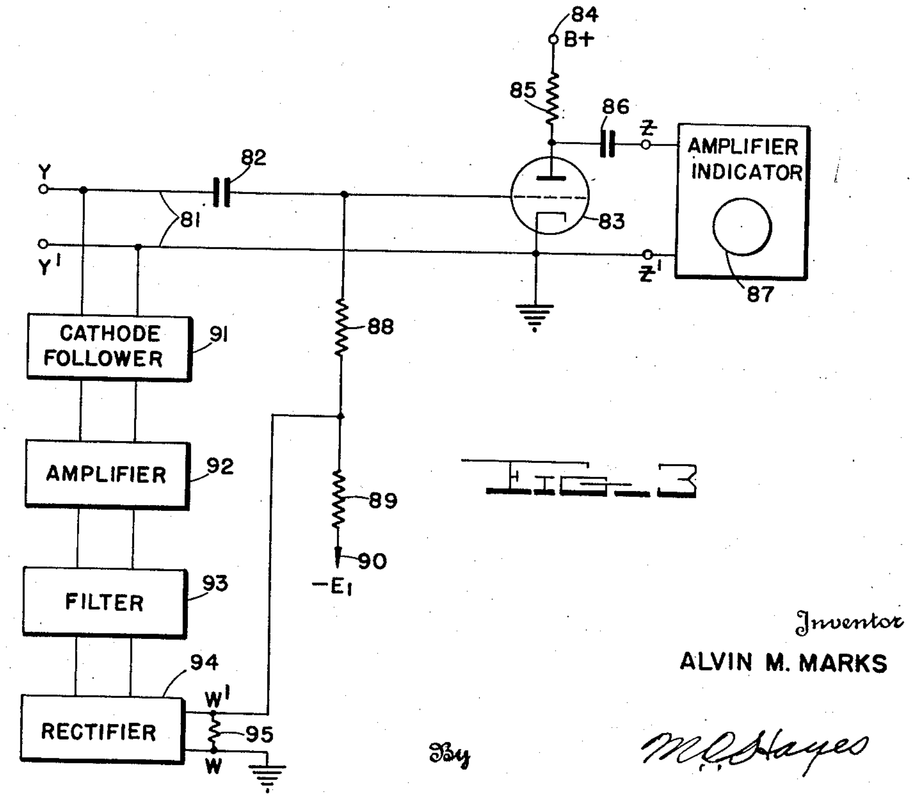
Fig. 3 is a schematic diagram showing an automatic spurious signal blocking device, which will pass signals only when the frequency on the dial corresponds to the actual frequency of the signal being received.

Referring now to Fig. 3 there is shown a schematic diagram, showing a signal blocking device for certain signals.

In Fig. 3 the terminal YY′ corresponds to the output of the equipment shown in Fig. 2 at the same terminals YY′.

The signals coming from YY′ are transmitted along the line 81, through condenser 82 to the grid of triode 83. The grid of the triode 83 is held at some negative potential, $-E_1$ applied at terminal 90 thru resistors 88 and 89. The negative potential $-E_1$ is sufficient to prevent the tube 83 from conducting since the grid thereby is held below the cutoff potential relative to the cathode which may be connected to ground. The input signal to YY′ is also applied to the cathode follower 91, shown in block diagram, which signal may be further amplified by amplifier 92, and applied to the input of the filter 93. The filter 93 is a band pass filter which will pass only a narrow range of frequencies approximating that of the frequency of modulation generated by means of the make or break contactor 33, shown in Fig. 2. When the frequency transmitted to YY′ contains this low modulation frequency, a sinusoidal component of this frequency is transmitted through the filter 93. As explained above, this will only occur when the frequency of the signal received is resonant with the tuned stub 68. The stub 68 will also serve to modulate all harmonics of the fundamental frequency to which it is tuned. These harmonics might convey the contactor modulation frequency to the terminals YY′ of the receiver and create a false signal at filter 93, but for the fact that they are too widely separated from the receiver local oscillator frequency, or any harmonic thereof, to produce a signal within the pass-band of the intermediate frequency stage of the receiver. Thus these harmonics are lost in the receiver, and only the fundamental to which the receiver and stub are tuned appears as a modulated output at YY′.

In the device of Fig. 2 this sinusoidal component is used directly to energize indicator light 50. In Fig. 3, the filter output is fed to a rectifier 94, which may be any conventional type of rectifier such as a full wave diode, or a copper oxide rectifier, preferably also including a conventional ripple filtering network, so that the output of the rectifier at the terminals WW′ will be at a substantially unfluctuating potential. The terminal W′ in Fig. 3 is thus given a positive potential relative to ground, when a received signal modulated by the contactor 33 is impressed across YY′. The positive potential at W′ is applied to the junction point of the resistors 88 and 89 thereby causing the tube 83 to unblock and to pass the signal output from YY′. The combination condenser 82 and resistor network 88, 89 and other associated components are of such magnitude as to provide a relatively long time constant thereby permitting an unblocking of the tube 83 as long as the contactor modulation component is applied to YY′; and simultaneously thereby permitting the intelligence, whether audible or visual to be transmitted along 81, through the tube 83 and applied to input terminals ZZ′ of the indicator 87 which may be of visual or audible type such as a cathode ray oscilloscope screen or a loud speaker. Bleeder resistor 95 across WW′ removes the D. C. positive potential by discharging the filter capacitors in the antiripple rectifier network when the impressed square wave, at YY′, is removed.

It will be understood from the operation of Fig. 2 hereinbefore described that squarewave components corresponding to the make and break contactor operation will be applied to the terminal YY′ only when the frequency of the signal being received corresponds to the frequency indicated on the receiver dial, and it is only under this circumstance, therefore, that the triode 83 will unblock and permit the signal to register upon the indicator 87. Signals which might create spurious responses will lack the additional squarewave components superimposed thereupon and will accordingly be unable to unblock the tube 83 and will of course not register upon the indicator.

Since the contactor 33, shown in Fig. 2, for connecting and disconnecting the stub 68 to the feeder line 12 is a mechanical device, the frequency of the make and break operation is accordingly limited. However, in many cases it will be desirable to receive audible or visual signals, without interference from a superposed squarewave. In the case of audible signals interference from the make and break contactors may be substantially or completely minimized by causing the make and break operation to occur at supersonic frequencies. In the case of the transmission of radar or television signals the squarewave components may be so arranged that a pulse occurs at the start or the end of a search cycle or frame. In either case the make and break operation may be accomplished electronically; for example, as shown in connection with Fig. 5. In this way the mechanical limitation on the frequency of the contactor operation is obviated, and moreover, a synchronizing means may be employed in conjunction with the electronic contactor means so as to produce a square wave of suitable phase and duration to produce the desired result.

Figure 4:
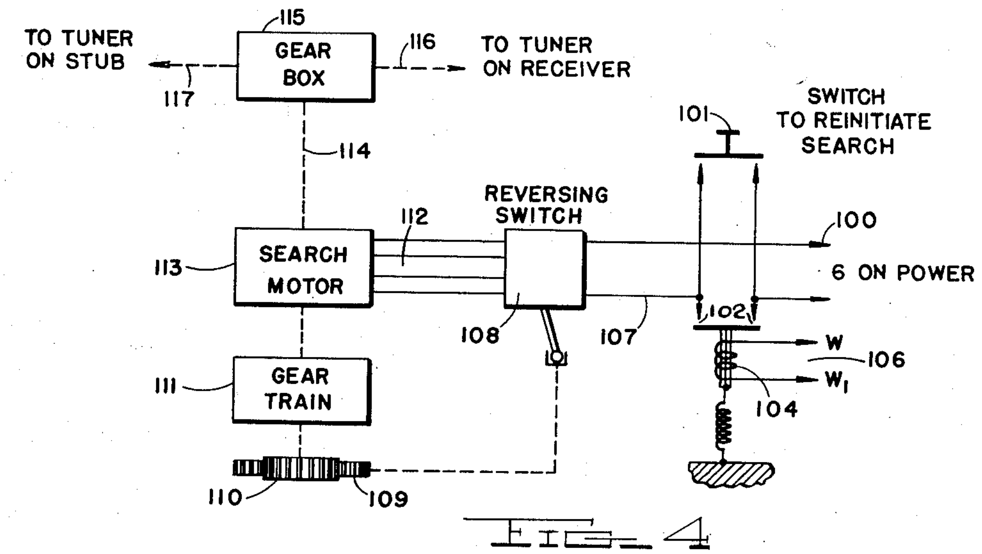
Fig. 4 shows a device according to this invention embodying means for causing a radio receiver tuning system to automatically search until the received signal frequency corresponds to the instantaneous dial reading.

Referring to Fig. 4 there is shown a means for automatically operating a search receiver for scaninng a frequency band, so as to avoid stopping the search receiver on spurious signals.

In Fig. 4 the gear box 115 corresponds to the gear box 52 shown in Fig. 2. Shaft 116 from the gear box 115 corresponds to shaft 53 and shaft 117 corresponds to the shaft 54 in Fig. 2. Shaft 114 is a drive shaft and may be compared to the crank shaft 51 in Fig. 2. In Fig. 4 the shaft is instead connected to a driving motor 113. The driving motor 113 is actuated through the reversing switch 108. Leads 112, connect the search motor 113 to the switch box 108. The search motor 113 is mechanically connected through another gear box 111 to a pinion 110 which drives a rack 109. The rack 109 is connected to the reversing switch 108. In operation when rack 109 reaches the extremity of its travel, the switch 108 is actuated and the motor 113 is reversed. The main power line 100, which for example may be a 60 cycle A. C. source is connected through the parallel push button switch 101 and the normally closed contacts 102 to input line 107, to the reversing switch 108, and thence to the motor 113. The relay 104, which controls contact 102 is actuated by the output potential WW' in Fig. 3 through the relay coil 104. When a signal is received, to which stub 68 is tuned in gang with receiver dial 20, a D. C. potential difference is established across WW' a current passes thru 104 and contacts 102 open, thereby causing the search motor 113 to stop. The search may reinitiated by means of push button 101, which reestablishes the motor current if potential WW' is removed by readjusting the tuner away from the signal frequency previously registered.

In operation, when the dial, 48, in Fig. 2, is tuned to frequency corresponding to input signal upon antenna 10 the signal is transmitted to YY', and superimposed thereon is the make and break frequency from a contactor 33. The make and break frequency is transmitted along the filter and rectifying channel, and appears at a constant potential WW' in Fig. 3. This positive voltage causes the search motor 113, to stop as above described and may simultaneously also unblock triode 83 in Fig. 3. In this manner, the receiver automatically searches until a signal is received in the receiver having a frequency equal to the actual signal frequency shown on the receiver dial, and the signal is then permitted to actuate the indicating apparatus 87. The signal continues to register upon the indicating apparatus 87 until the push button 101 is actuated and the receiver dial setting and stub is charged. The search is then reinitiated until the next highest or the next lowest frequency signal is encountered which fulfills the above condition.

Figure 5:
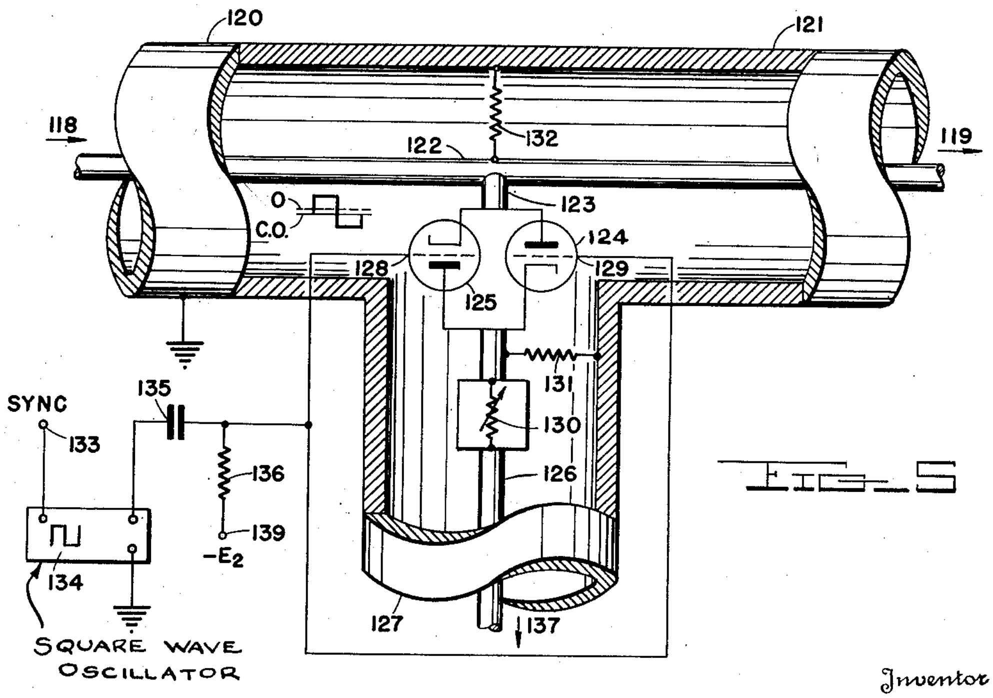
Fig. 5 shows a means of connecting and disconnecting a stub from a coaxial line, electronically, to cause a predetermined amplitude variation of a signal frequency in accordance with synchronized input pulses.

Referring now to Fig. 5 there is shown an enlarged view of a coaxial feeder line 120 having an internal conductor 122 and an external conductor 121, at a stub 127 making a T connection therewith. The stub 127 has a central conductor 126. Joining the central conductors 126 and 122 is an electronic conducting device, which for the purpose of illustration is shown as twin triode tubes 124 and 125. It will be understood that this twin triode may in certain instances be replaced with a single triode, pentodes, or other types of vacuum tubes, the elements of which may be in one or more envelopes. In one form of the present invention the tubes 124 and 125 may comprise extremely small triodes which are now well known in the art, and which can conveniently fit within certain types of coaxial cable without substantial obstruction to the propagation of the electromagnetic waves along the coaxial line.

In Fig. 5 there is shown an oscillator 134, which may be synchronized in any desired manner thru terminal 133 as herein discussed. The output of oscillator 134 is applied through capacitor 135 to the grids 128 and 129 of the tubes 125 and 124 respectively. The grids 128 and 129 may be made maintained below cutoff by the negative potential $-E_2$ applied at terminal 139 thru the resistor 136.

In operation a squarewave, pulse, or sine wave from the oscillator 134 is applied to the grids of 128 and 129 thereby unblocking tubes 124 and 125 and thereby enabling current to flow into and away from the stub under the influence of the impressed electromagnetic wave when the oscillator signal is sufficiently positive. Thus, when a sufficiently positive oscillator signal is applied to the grids of the tubes 124 and 125, the circuit to the stub is unblocked in both directions enabling the high frequency current to flow thru the stub from the coaxial feeder line.

The stub, which acts like a series resonant element, is thus periodically connected and disconnected from the feeder line electronically, and hence the coaxial feeder line, 120, carrying a fundamental frequency at the series resonant frequency of the stub 127 is periodically attenuated, or amplitude modulated at the control oscillator, 134, frequency. The degree of the periodic attenuation or modulation may be controlled by the adjustment of the variable resistor 130, which is in series with the series resonant stub.

Resistors 131 and 132, ground cathode and plate elements of the tubes 124 and 125 and so block the tubes, when the grids are not made positive by the oscillator signal. Resistors 131 and 132 are of a sufficiently high resistance value so that they do not cause appreciable signal attenuation by themselves.

If necessary, a booster, preferably an untuned amplifier, may be provided prior to 118 to increase the amplitude of the signal sufficiently to drive 124 and 125 into conduction.

While the devices herein described, and the forms of apparatus for their operation, constitute preferred embodiments of the invention, it is to be understood that the invention is not limited to these precise devices and forms of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In a frequency distinguishing device a series resonant element, a radio receiver, an input channel for said receiver, means for periodically connecting and disconnecting the input channel to said series resonant element, means for simultaneously tuning said receiver and said series resonant element to the same frequency, an amplifier and filter circuit connected in parallel across an output channel of said receiver, and indicating means on said receiver, said indicating means being connected to the output of said filter circuit, whereby said indicating means is made responsive when said receiver dial indicates actual frequency being received.

2. In combination with a receiver having an input channel and an output channel, means for selectively receiving signals of a particular frequency comprising means tuning said receiver to said particular frequency, a tuned series resonant element in said input channel, means periodically connecting and disconnecting said series resonant element in shunting relationship with said input channel for producing a characteristic modulation in said particular frequency signal, resonant frequency adjusting means for said series resonant element mechanically ganged with the tuning element of said receiver, means in said receiver for detecting said modulation in said particular frequency signals, and indicator means responsive to said detector means for indicating the presence in said receiver of said particular frequency signals.

3. In a radio receiver having a signal input channel and a signal output channel, means for blocking spurious signals and passing signals of a fundamental frequency comprising means tuning said receiver to said fundamental frequency, a series resonant element, means ganging said resonant element in synchronism with said receiver to said fundamental frequency, means for periodically connecting and disconnecting said series resonant element across said input channel to said radio receiver, whereby amplitude modulation is impressed upon said fundamental signal being received, filter means connected to said radio receiver deriving a control voltage responsive to said amplitude modulation, blocking means in said output channel for normally blocking said output channel, and means responsive to said control voltage for rendering said blocking means inoperative.

4. In combination with a receiver having an input channel and an output channel, means for tuning said receiver to a particular fundamental frequency, modulating means in the input channel imposing a characteristic modulation on signals of the frequency to which said modulating means is tuned, ganging means for tuning said modulating means to said fundamental frequency, means in said output channel normally blocking said output channel, and filter means connected to said output channel for unblocking said output channel responsive to said characteristic modulation in the output of said receiver.

5. Means for limiting reception of signals in a radio receiver to those having a fundamental frequency to which the receiver is tuned comprising an input channel to said receiver, motor driven tuning means for varying the tuning of said receiver, a series resonant element, means tuning said series resonant element to the same frequency as the receiver, means periodically connecting and disconnecting said series resonant element across said input channel, whereby signals in said input channel to which said resonant element is tuned are periodically attenuated, means normally blocking the output of said receiver, filter means in said receiver developing a control voltage responsive to said periodic attenuation, means rendering said blocking means inoperative responsive to said control voltage, and means stopping said motor driven tuning means responsive to said control voltage.

6. A receiver for receiving signals of a selected frequency comprising an input channel, tuned means in said input channel for conditioning input signals of said selected frequency, an output channel in said receiver, blocking means in said receiver normally blocking output signals to said output channel, and means in said receiver responsive to said conditioning for rendering said blocking means inoperative.

7. A receiver for receiving signals of a selected frequency comprising an input channel, tuned means in said input channel for conditioning input signals of said selected frequency, an output channel in said receiver, blocking means in said receiver normally blocking output signals to said output channel, tuning means in said receiver for varying said selected frequency, ganging means varying said tuned conditioning means in synchronism with said tuning means, and means in said receiver responsive to said conditioning for rendering said blocking means inoperative and said tuning means invariable.

8. Means for limiting reception of signals in a radio receiver to those having a fundamental frequency to which the receiver is tuned comprising an input channel to said receiver, a series resonant element, means tuning said series resonant element to the same frequency as the receiver, means periodically connecting and disconnecting said series resonant element across said input channel, whereby signals in said input channel to which said resonant element is tuned are periodically attenuated, means normally blocking the output of said receiver, and filter means in said receiver responsive to said periodic attenuation for rendering said blocking means inoperative.

9. Electronic means for intermittently connecting a coaxial cable to a coaxial feeder line at a selected frequency comprising twin triode tubes having the plate of one triode and the cathode of the other triode connected together and to said coaxial cable and having the remaining plate and cathode connected together and to said coaxial feeder line, a source of negative potential connected to the grids of said triodes, whereby said triodes are normally biased to non-conduction, a source of intermittent positive voltage, said intermittent voltage varying at said selected frequency, and means connecting said intermittent voltage to said grids, whereby said triodes are rendered intermittently conducting at said selected frequency.

10. In combination a coaxial line including an inner conductor and an outer conductor, said line outer conductor having an aperture therein, a coaxial stub including an inner conductor and an outer conductor, means connecting one end of said stub outer conductor to the periphery of said aperture, one end of said stub inner conductor supported for projection through said aperture to a position adjacent said line inner conductor, twin triode tubes having the plate of one triode and the cathode of the other triode connected together and to said inner coaxial line conductor and having the remaining plate and cathode connected together and to said stub inner conductor, a source of negative potential connected to the grids of said triodes, whereby said triodes are normally biased to non-conduction, a source of intermittent positive voltage, said intermittent voltage varying at said selected frequency, and means connecting said intermittent voltage to said grids, whereby said triodes are rendered intermittently conducting at said selected frequency.

11. Radio receiver tuning means for attachment to the input and output channels of a receiver comprising an input feed line connected to said input channel, a series resonant element, means tuning said series resonant element to the same frequency as said receiver, means connecting said series resonant element across said feed line, said connecting means being twin triode tubes having the plate of one triode and the cathode of the other triode connected together and to said feed line and having the remaining plate and cathode connected together and to said series resonant element, a source of negative potential connected to the grids of said triodes whereby said triodes are biased to non-conduction, a source of intermittent positive voltage applied to said grids whereby said triodes are rendered intermittently conducting, said intermittent voltage varying at a selected frequency, means normally blocking said output channel, and filter circuit means connected to said output and responsive to said selected frequency for rendering said blocking means inoperative.

12. Tuning means for use with a radio receiver having an antenna and a coaxial feed line connecting said antenna to the input channel of said receiver comprising a series resonant element, means tuning said series resonant element to the same frequency as said receiver, means connecting said series resonant element across said coaxial feed line, said connecting means being twin triode tubes having the plate of one triode and the cathode of the other triode connected together and to said feed line and having the remaining plate and cathode connected together and to said series resonant element, a source of negative potential connected to the grids of said triodes whereby said triodes are normally biased to non-conduction, a source of intermittent positive voltage applied to said grids whereby said triodes are rendered intermittently conducting, said intermittent voltage varying at a selected frequency, means normally blocking the output of said receiver, and filter circuit means connected to said output and responsive to said selected frequency for rendering said blocking means inoperative.

References Cited in the file of this patent

UNITED STATES PATENTS

| Number | Name | Date |
|---|---|---|
| 1,233,841 | Butcher | July 17, 1917 |
| 2,160,566 | Schmidt | May 30, 1939 |
| 2,189,549 | Hershberger | Feb. 6, 1940 |
| 2,252,811 | Lowell | Aug. 19, 1941 |
| 2,259,658 | Parker | Oct. 21, 1941 |
| 2,262,218 | Andrews | Nov. 11, 1941 |
| 2,283,523 | White | May 19, 1942 |
| 2,293,945 | Pawsey | Aug. 25, 1942 |
| 2,380,791 | Rosencrans | July 31, 1945 |
| 2,392,672 | Koch | Jan. 8, 1946 |
| 2,404,568 | Dow | July 23, 1946 |
| 2,410,641 | Evans | Nov. 5, 1946 |
| 2,426,186 | Dow | Aug. 26, 1947 |
| 2,427,089 | Clifford | Sept. 9, 1947 |
| 2,457,173 | Newitt | Dec. 28, 1948 |
| 2,521,752 | Schwarz | Sept. 12, 1950 |
| 2,532,157 | Evans | Nov. 28, 1950 |
| 2,553,219 | Tellier | May 15, 1951 |
| 2,639,374 | Goodrich | May 19, 1953 |